UNITED STATES PATENT OFFICE 2,535,015

DIPHENOL COMPOUND COMPOSITION FOR COCCIDIOSIS CONTROL

Julius E. Johnson, Jr., Midland, and Dorsey R. Mussell, Clare, Mich., assignors to The Dow Chemical Company, Midland, Mich., a corporation of Delaware No Drawing. Application June 19, 1948, Serial No. 34,135

5 Claims. (Cl. 167—53.1)

This invention relates to coccidiosis control and is particularly directed to compositions and methods for the suppression of coccidial infection in poultry and the like.

Coccidiosis is a very contagious protozoan disease which is prevalent and destructive among chickens, ducks, turkeys, and pigeons. The coccidia invade and multiply in various organs, but particularly the digestive tract of their host. During the process of growth and multiplication they erode the epithelial tissue of the cecum and small intestine of the fowl, bringing about hemorrhage, weakness, and serious digestive disturbances. Birds, if they do not succumb rapidly to the infection, are rendered economically unfit by chronic forms of the disease.

Numerous remedies have been suggested and made available for the suppression of coccidiosis. Their administration has usually been through the water or feed for the fowl. Many of these materials are of little efficacy, while others are too expensive, or too toxic for prophylactic administration. One of the difficulties encountered in such administration has been the adverse effect which certain of the materials have upon the metabolic activity. Another difficulty has been the poisoning of the blood-forming organs and a subsequent reduction in the number of red and white blood cells throughout the body. These effects have made the use of many remedies hazardous and unprofitable.

An object of this invention is the provision of an inexpensive improved method and composition for the suppression of coccidial infection in poultry. An additional object is the provision of a method and composition which may be employed prophylactically without adversely affecting the metabolic activity of the fowl. Other objects will become apparent from the following specification.

According to this invention we have discovered that coccidial infection in poultry may be suppressed by feeding the fowl a diphenol having the following formula:

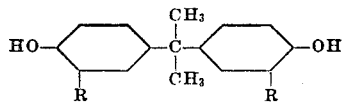

wherein R represents a member of the group consisting of the lower alkyl radicals containing from 1 to 4 carbon atoms, inclusive, allyl, phenyl and hydrogen. These compounds may be administered with the feed or otherwise introduced into the intestinal tract in dosages sufficient to suppress the development of infection. They do not impart any unpalatable taste, odor, or flavor to the flesh of fowl which has been prepared for eating. They are inexpensive and may be administered continuously or from hatching until the fowl has passed through the more hazardous early weeks of life, without adversely affecting metabolic activity. The compounds are most effective in suppressing the disease when administered prior to or within a reasonable time following the ingestion of coccidial oöcysts by the bird.

In practice, good results have been obtained when each bird ingests daily from 250 to 700 milligrams of the diphenol per kilogram of body weight. The preferred dosage varies somewhat with the particular diphenol employed. In feed, the diphenol content should be so adjusted that the amount of agent ingested falls within the indicated range. Where the medicated feed constitutes the principal ration, from 0.2 to 0.4 per cent by weight of the agent may be employed with satisfactory results.

A convenient method of operation comprises dispersing a finely ground diphenol in the feed employed as part or sole ration for the flock. In another method the diphenol is dissolved in a small amount of an organic solvent such as acetone, methylene chloride, or ethyl acetate; the resulting mixture dispersed in the feed; and the feed dried to remove the solvent. An additional method comprises dissolving the diphenol in an edible oil such as cottonseed, coconut, olive or cod liver oil and dispersing this solution in the feed. Any commercial starting, growing, or laying mash may be employed in combination with the diphenol. Such mash should contain a quantity of ground grains, meat or protein substitute, powdered milk, minerals, and vitamins sufficient to furnish a diet adequate for the metabolic requirements of the fowl concerned. Alternatively, the diphenols may be administered in the form of capsules or tablets, either alone, or dispersed in a suitable non-toxic carrier.

The method of suppressing coccidial infection and the medicated feed compositions whereby this desirable result is accomplished constitute preferred embodiments of this invention.

The diphenols of this invention, may be prepared by reacting 2 mols of phenol or a suitable substituted phenol with 1 mol of acetone. In practice the use of a molecular excess of the phenolic reactant is preferred. Examples of substituted phenols which may be employed are 2-methylphenol, 2-ethylphenol, 2-propylphenol, 2-butylphenol, and 2-allylphenol. The reaction is carried out in the presence of a sulfur-containing catalyst, such as sulfur monochloride, sulfur dichloride, or sodium sulphide, and of an acid-acting condensing agent, such as hydrochloric acid, sulphuric acid, or hydrogen chloride Good results are obtained in preparations carried out at temperatures of 40° C. or lower and employing 5 mols of phenol or a substituted phenol per mol of acetone. In practice from about 0.3 to 0.5 mol of the hydrogen chloride per mol of the acetone present in the mixture has been found to favor the production of the compounds in high yields.

The phenol and acetone are mixed together and hydrogen sulphide introduced in such amount and at such a rate as to be absorbed in the mixture. The condensation is then accomplished by adding the hydrogen chloride to the reaction mixture portionwise with stirring. The condensation begins immediately upon the introduction of the hydrogen chloride with the production of the desired diphenol compound and water of reaction. The reaction is exothermic and stirring and cooling are generally required during the addition of the condensing agent to prevent overheating. Best yields are obtained by allowing the reaction mixture to rest for several days at room temperature before attempting separation of the desired product. The separation may be accomplished in the conventional manner by repeated washing of the crude reaction product with water; fractionally distilling under reduced pressure to recover solvent, water and excess phenol or substituted phenol; and steaming the residue to remove the last traces of the unreacted phenol or substituted phenol.

*Example 1*

2.5 parts by weight of 4,4'-isopropylidene-di-(2-methylphenol) melting at 96.5° to 97° C. was dissolved in 20 parts of acetone. This solution was dispersed in a commercial starting mash and the mash subsequently dried to remove the solvent. The diphenol was employed in an amount sufficient to produce a composition containing 0.3 per cent by weight of the agent. This composition and the unmodified starting mash were fed as an entire ration to two groups of chickens. Each group consisted of four chickens which were two weeks of age. 24 hours after the initiation of the diet, 40,000 *Eimeria tenella* oöcysts were introduced directly into the crop of each bird. Seven days following the inoculation, the birds were sacrificed and autopsied. A cecal examination of each bird was carried out to determine the extent of cecęal necrosis and a sample of cecal contents was removed and examined microscopically for the presence or absence of oöcysts. The numerical ratings 0, 1, 2, 4 and 8 were assigned both to the degree of necrosis and to the abundance of oöcysts in the cecum. The ratio of the summation of these ratings to the total number of observations carried out in the particular group of fowl gives the degree of infection present in the birds. A comparison between the degrees of infection of treated and untreated control groups serves as a basis for estimating the efficacy of the treatment according to the following formula:

$$\text{Index of efficacy} = \left(\frac{x-y}{x}\right) \cdot 100$$

wherein $x$ represents the degree of infection of control birds and $y$ the degree of infection of treated birds. The numerical ratings, degrees of infection, and index of efficacy are recorded in the following table:

| | Chickens Fed Modified Mash | Chickens Fed Unmodified Mash |
|---|---|---|
| Chicken No | 1-2-3-4 | 1-2-3-4 |
| Numerical rating of cecal necrosis | 0-0-1-0 | 4-4-4-2 |
| Numerical rating of abundance of oocysts | 0-0-1-1 | 4-2-8-4 |
| Degree of infection in the group | 0.37 | 4.0 |
| Index of efficacy | 92 | |

*Example 2*

Starting mash containing various diphenols were prepared and tested with unmodified mash in a manner similar to that of Example 1. The concentrations and types of diphenols employed in the mash compositions together with the indices of efficacy are recorded in the following table:

| Active Ingredient | Per Cent by Weight of Diphenol in Mash | Index of Efficacy |
|---|---|---|
| 4,4'-isopropylidene-di-(2-isopropylphenol) (M. P. 96.5°-97° C.) | 0.3 | 97 |
| 4,4'-isopropylidene-di-(2-methylphenol) (F. P. 135.5° C.) | 0.3 | 100 |
| 4,4'-isopropylidene-di-(2-secondary butylphenol) (M. P. 89°-90° C.) | 0.3 | 81 |
| 4,4'-isopropylidene-di-(2-allylphenol) (refractive index n/D at 25° C. of 1.5862) | 0.3 | 92 |
| 4,4'-isopropylidene-diphenol (F. P. of 156.5° C.) | 0.4 | 91 |
| 4,4'-isopropylidene-di-(2-phenylphenol) (M. P. 98°-99° C.) | 0.3 | 88 |

*Example 3*

2.4 parts by weight of 4,4'-isopropylidene-di-(2-methylphenol) was dissolved in 16 parts of cottonseed oil. This solution was dispersed in a commercial starting mash to produce a composition containing 0.3 per cent by weight of the diphenol. This composition and unmodified starting mash were tested in a manner similar to that of Example 1. The mash containing the diphenol was found to have an index of efficacy of 87.

*Example 4*

4,4'-isopropylidene-di-(2-methylphenol) was ground through a screen having 0.295 millimeter square openings. This finely ground diphenol was mechanically dispersed and mixed in a poultry starting mash to produce a composition containing 0.3 per cent by weight of the agent. This composition and unmodified starting mash were tested in a manner similar to that of Example 1. The modified mash was found to have an index of efficacy of 92.

*Example 5*

A starting mash containing 0.3 per cent by weight of 4,4'-isopropylidene-di-(2-methylphenol) was prepared in a manner similar to that of Example 4. This composition and unmodified mash were fed to two groups of chickens as a sole ration for 44 days. Each group consisted of 40 white rock cockerels which were 4 days old. At intervals the chickens were weighed and the average weight per chicken for each group determined. The average weights at the end of various feeding intervals for the treated and control groups are recorded in the following table:

| Age of Chicken in Days | Average Weight in Pounds | |
|---|---|---|
| | Mash containing 0.3 Per Cent Diphenol | Unmodified Mash |
| 4 | 0.10 | 0.095 |
| 9 | 0.121 | 0.112 |
| 16 | 0.181 | 0.184 |
| 23 | 0.29 | 0.27 |
| 30 | 0.49 | 0.44 |
| 37 | 0.72 | 0.66 |
| 44 | 0.95 | 0.95 |

*Example 6*

Starting mash containing 0.2 per cent by weight of 4,4'-isopropylidene-di-(2-isopropylphenol) was prepared and tested with unmodified mash in a manner similar to that of Example 5. The average weights at the end of various feeding intervals for the treated and control groups are recorded in the following table:

| Age of Chickens in Days | Average Weight in Pounds | |
|---|---|---|
| | Mash Containing 0.2 Per Cent Diphenol | Unmodified Mash |
| 4 | 0.097 | 0.095 |
| 9 | 0.112 | 0.112 |
| 16 | 0.171 | 0.184 |
| 23 | 0.30 | 0.27 |
| 30 | 0.48 | 0.44 |
| 37 | 0.70 | 0.66 |
| 44 | 0.95 | 0.95 |

We claim:

1. A composition for the suppression of coccidial infection in fowl which comprises a feed and dispersed therein as an active ingredient a diphenol having the following formula:

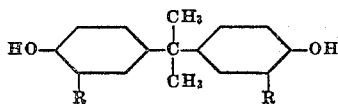

wherein R represents a member of the group consisting of the lower alkyl radicals containing from 1 to 4 carbon atoms, inclusive, allyl, phenyl and hydrogen.

2. A composition for the suppression of coccidial infection in fowl which comprises a feed and dispersed therein as an active ingredient a diphenol having the following formula:

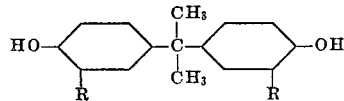

wherein R represents a member of the group consisting of the lower alkyl radicals containing from 1 to 4 carbon atoms, inclusive, allyl, phenyl and hydrogen.

3. A composition for the suppression of coccidial infection in fowl which comprises a feed and dispersed therein as an active ingredient 4,4'-isoproylidene-di-(2-methylphenol) in the amount of from 0.2 to 0.4 per cent by weight of the composition.

4. A composition for the suppression of coccidial infection in fowl which comprises a feed and dispersed therein as an active ingredient 4,4'-isopropylidene-di-(2-isopropylphenol) in the amount of from 0.2 to 0.4 per cent by weight of the composition.

5. A composition for the suppression of coccidial infection in fowl which comprises a feed and dispersed therein as an active ingredient 4,4'-isopropylidene-di-(2-phenylphenol) in the amount of from 0.2 to 0.4 per cent by weight of the composition.

JULIUS E. JOHNSON, Jr.
DORSEY R. MUSSELL.

REFERENCES CITED

The following references are of record in the file of this patent:

UNITED STATES PATENTS

| Number | Name | Date |
|---|---|---|
| 2,058,394 | Arvin | Oct. 27, 1936 |
| 2,061,779 | Semon | Nov. 24, 1936 |
| 2,158,446 | Werft | May 16, 1939 |

OTHER REFERENCES

Farmers' Bulletin 1652 (1932), page 38.